United States Patent [19]

Ishizawa et al.

[11] Patent Number: 4,540,627
[45] Date of Patent: Sep. 10, 1985

[54] MAGNETIC RECORDING MEDIUM

[75] Inventors: Akio Ishizawa, Tokyo; Toshio Hukaya; Katuya Kumagai, both of Yokohama; Tatuo Takeuchi, Zushi, all of Japan

[73] Assignee: Kabushiki Kaisha Toshiba, Kawasaki, Japan

[21] Appl. No.: 631,754

[22] Filed: Jul. 17, 1984

[30] Foreign Application Priority Data

Aug. 19, 1983 [JP] Japan ................................. 58-150155

[51] Int. Cl.$^3$ ............................ G11B 5/70; G11B 5/72
[52] U.S. Cl. .................................. 428/328; 252/62.54; 360/134; 360/135; 360/136; 427/128; 427/131; 428/329; 428/694; 428/900
[58] Field of Search ..................... 428/694, 695, 425.9, 428/900, 328, 329; 427/128, 131; 252/62.54; 360/134–136

[56] References Cited

U.S. PATENT DOCUMENTS

| | | | |
|---|---|---|---|
| 4,018,968 | 4/1977 | Neumann | 428/695 |
| 4,063,000 | 12/1977 | Aonuma | 428/403 |
| 4,074,012 | 2/1978 | Heikkinen | 428/425.9 |
| 4,197,347 | 4/1980 | Ogawa | 428/328 |
| 4,197,357 | 4/1980 | Huisman | 428/900 |
| 4,247,593 | 1/1981 | Seto | 428/328 |
| 4,352,859 | 10/1982 | Yoda | 428/522 |
| 4,420,537 | 12/1983 | Hayama | 428/694 |
| 4,431,700 | 2/1984 | Yamada | 428/900 |

FOREIGN PATENT DOCUMENTS

| | | | |
|---|---|---|---|
| 0150104 | 11/1979 | Japan | 428/425.9 |
| 0141606 | 11/1979 | Japan | 428/694 |
| 0147813 | 11/1979 | Japan | 428/900 |

*Primary Examiner*—Ellis P. Robinson
*Attorney, Agent, or Firm*—Schwartz, Jeffery, Schwaab, Mack, Blumenthal & Evans

[57] ABSTRACT

Disclosed is a magnetic recording medium which comprises magnetic particles; a phosphate represented by the formula:

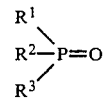

wherein $R^1$, $R^2$ and $R^3$ may be the same or different and each represent $R^4O-CH_2O-_n$ (wherein $R^4$ is an alkyl group having 8 to 20 carbon atoms or an alkylphenyl group whose alkyl group moiety has 8 to 20 carbon atoms, and n is an integer of 2 to 10) or a group of HO—, with the proviso that at least one of $R^1$, $R^2$ and $R^3$ is a group of $R^4O-CH_2CH_2O-_n$ (wherein $R^4$ and n are as defined above); a lecithin; and a binder.

5 Claims, 6 Drawing Figures

MAGNETIC RECORDING MEDIUM

BACKGROUND OF THE INVENTION

This invention relates to a magnetic recording medium. More particularly, it relates to a recording medium having a large hysteresis squareness ratio and at the same time having excellent wear resistance, which are owing to an improvement in the orientation characteristics of magnetic particles by virtue of a dispersing agent.

In general, magnetic recording media are produced by coating a substrate made of polyester film or the like with a magnetic coating material prepared from magnetic particles, resins and others, by various coating methods. However, when the magnetic particles have been dispersed nonuniformly in the magnetic coating material, the orientation rate of the magnetic particles in a magnetic recording medium obtained are lowered, thereby resulting in decrease in the hysteresis squareness ratio and causing a lowering of noise characteristics and decrease in reproduction output. For this reason, it has been usually practiced that a dispersing agent such as a surfactant is added to the magnetic coating material in order to enhance the dispersibility of the magnetic particles.

However, most of the dispersing agents known in the art have had problems that, as the amount of the agent to be added increases, there occurs exudation of the dispersing agent on the surface of a magnetic recording medium (i.e. a bleeding phenomenon), adhesion of films of the magnetic recording medium (i.e. a blocking phenomenon) or decrease of wear resistance due to the softening of coated films.

For instance, according to a finding previously made by the present inventors, employment of an ester of phosphoric acid with monoalkyl- or monoalkylphenyl-polyethylene glycol as a dispersing agent for the magnetic particles was useful for improvement in the dispersibility of the magnetic particles contained in a magnetic coating material, thereby remarkably increasing the hysteressis squarencess ratio of a magnetic recording medium. Such a dispersing agent, however, was defective in that, when it is added in a greater amount, there occurred on coated films undesirable phenomena such as bleeding, blocking and softening, and the wear resistance of the coated film drastically decreased.

Accordingly, it has been desired to develop a magnetic recording medium having overcome the defects mentioned above, and large in both the hysteresis squareness ratio and the wear resistance.

SUMMARY OF THE INVENTION

This invention aims at providing a magnetic recording medium large in both the hysteresis squarness ratio and the wear resistance.

The present inventors have made intensive studies to attain the above object. As a result, it has been disclosed that when magnetic particles are dispersed in a magnetic coating material by use of a dispersing agent comprising lecithin and a particular phosphate, a magnetic recording medium obtained has high hysteresis squareness ratio and high wear resistance, and thus this invention has been accomplished.

The magnetic recording medium according to this invention is characterised by comprising magnetic particles; a phosphate represented by the formula:

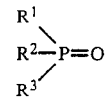

wherein $R^1$, $R^2$ and $R^3$ may be the same or different and each represent $R^4O-CH_2O-_n$ (wherein $R^4$ is an alkyl group having 8 to 20 carbon atoms or an alkylphenyl group whose alkyl group moiety has 8 to 20 carbon atoms, and n is an integer of 2 to 10) or a group of HO—, with the proviso that at least one of $R^1$, $R^2$ and $R^3$ is a group of $R^4O-CH_2CH_2O-_n$ (wherein $R^4$ and n are as defined above); a lecithin; and a binder.

DESCRIPTION OF THE PREFERRED EMBODIMENTS

Figure 1:
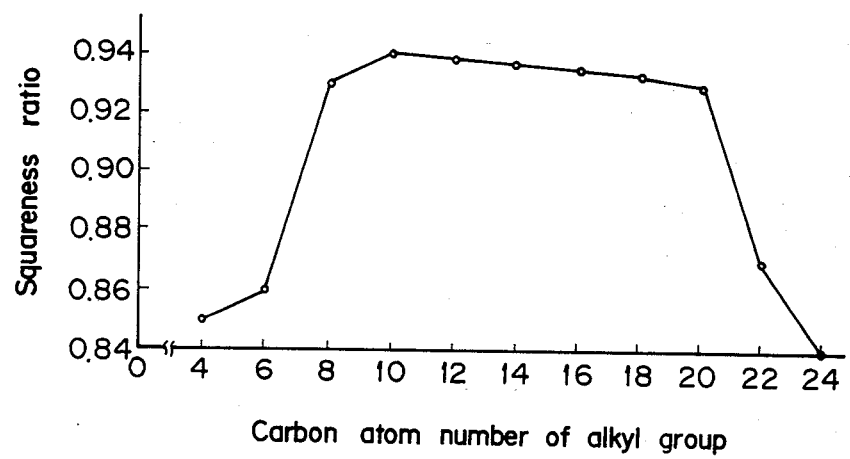
FIG. 1 is a diagram to explain the invention by showing the relationship between the number of carbon atoms of alkyl group, which is a structural factor of phosphate, and the squareness ratio of a magnetic recording medium.

As the magnetic particles, any of known magnetic particles used for magnetic recording may be used, which are preferably exemplified by needle crystals such as $\gamma$-Fe$_2$O$_3$ and Co-deposited $\gamma$-Fe$_2$O$_3$, metallic magnetic particles such as those of Fe, Fe-Ni alloy and Fe-Ni-Co alloy, or hexagonal ferrites represented by the general formula: MO._n(Fe$_{1-x}$A$_x$)$_2$O$_3$ (wherein M represents any one of Ba, Sr, Pb and Ca; n represents a number of 5 to 6; A, by which a part of Fe is substituted, represents a transition metal such as Ti, Co, Zn, In, Mn, Cu, Ge or Nb). Most preferably, there may be used particles of hexagonal ferrite, which are suitable for use in a high-density vertical magnetization recording, having a mean particle size of from 0.01 to 0.3 $\mu$m and coercive force of from 200 to 2,000 Oe.

The mean particle size of the hexagonal ferrite has been set to range 0.01 to 0.3 $\mu$m because strong magnetism necessary for the magnetic recording will not be exhibited at a mean particle size less than 0.01 $\mu$m, while, at a mean particle size exceeding 0.3 $\mu$m, it becomes difficult to advantageously perform high-density recording. Also, the coercive force has been set to range from 200 to 2,000 Oe because recording density can not be made high at coercive force less than 200 Oe and, on the other hand, a magnetic recording head becomes saturated at coercive force exceeding 2,000 Oe.

As the dispersing agent, a phosphate and lecithin are used in combination. Of these, the phosphate is a component by which the dispersibility of magnetic particles is enhanced and the hysteresis squareness ratio is increased; the lecithin is a component by which bleeding and blocking are prevented and durability of a magnetic recording medium is improved.

The phosphate used is represented by the formula:

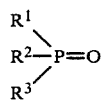

wherein $R^1$, $R^2$ and $R^3$ may be the same or different and each represent $R^4O-CH_2O-_n$ (wherein $R^4$ is an alkyl group having 8 to 20 carbon atoms or an alkylphenyl group whose alkyl group moiety has 8 to 20 carbon atoms, and n is an integer of 2 to 10) or a group of HO—, with the proviso that at least one of $R^1$, $R^2$ and $R^3$ is a group of $R^4O-CH_2CH_2O-_n$ (wherein $R^4$ and n are as defined above).

The number of carbon atoms of the alkyl group represented by $R^4$ in the above formula has been set to range from 8 to 20 because the dispersing ability of the phosphate is lowered and hysteresis squareness ratio of a magnetic recording medium obtained decreases when the alkyl group has carbon atoms less than 8 or exceeding 20.

For the similar reasons to the above, repetition number n for the unit of the ethylene oxide has been selected in the range of from 2 to 10, whereby the hysteresis squareness ratio of the magnetic recording medium is enhanced.

The lecithin may include soy bean oil lecithin, egg yolk lecithin, liver lecithin and the like. The licithin is a compound represented by the formula:

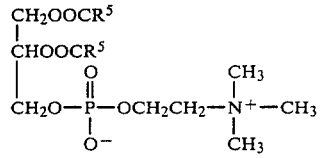

wherein $R^5$ is usually an alkyl group having 11 to 18 carbon atoms.

The dispersing agent comprising the phosphate and the lecithin should preferably be contained in an amount of from 2 to 6 parts by weight based on 100 parts by weight of magnetic particles. Of the dispersing agent the weight ratio of the phosphate to the lecithin should preferably range from 5:1 to 1:1. This is because the dispersing ability thereof for the magnetic particles becomes smaller when the amount of the dispersing agent contained is less than 2 parts by weight and, on the other hand, the wear resistance decreases when it exceeds 6 parts by weight. Similarly, the squareness ratio decreases when the ratio of content of the phosphate to the lecithin is less than 1 and the wear resistance is lowered when it exceeds 5.

The binder to be used may include known polymers of, for instance, a vinyl chloride system, an acryl system, a polyurethane system or a cellulose system. The binder is usually contained in an amount of from 15 to 25 parts by weight based on 100 parts by weight of magnetic particles.

The magnetic recording medium according to this invention may be produced by, for instance, the following manner: First, the magnetic particles, the binder and the dispersing agent are each weighed in proper amounts, which are added to a suitable solvent comprising tetrahydrofuran, methyl ethyl ketone, butyl acetate, toluene, cyclohexane, etc. to prepare a magnetic coating material. Next, with this magnetic coating material the surface of a substrate made, for instance, of polyester film or the like is coated by a conventional coating method, followed by drying the same. Thus, a magnetic recording medium of this invention can be obtained.

As is apparent from the foregoing explanations, the magnetic recording medium according to this invention is effectual in that (1) because a phosphate having excellent dispersing ability has been employed as a dispersing agent, the orientation rate is are improved to have attained a large hysteresis squareness ratio and, moreover, (2) because lecithin has been also used in combination, the coated films are free from bleeding, blocking and softening to have excellent wear resistance. Accordingly, the invention has a very great industrial value.

The magnetic recording medium according to this invention will be described in greater detail by the following Examples.

EXAMPLES 1 TO 13 AND COMPARATIVE EXAMPLES 1 to 9

Relationship between structural factors $R^4$ and n of the phosphate and squareness ratio First, 100 parts by weight of $Ba(CoTi)_{0.5}Fe_{11}O_{19}$ powder having a particle size of 0.08 μm and coercive force of 800 Oe, 10.2 parts by weight of a vinyl chloride - vinyl acetate copolymer, 8.2 parts by weight of a polyurethane resin, 1.5 parts by weight of soybean lecithin (whose constituent fatty acid $R^5$ is an alkyl group having 11 to 18 carbon atoms) and 2.5 parts by weight of a phosphate principally composed of alkylphenyl-polyethylene glycol monophosphate were added into a mixed solvent comprising 150 parts by weight of methyl ethyl ketone, 100 parts by weight of toluene and 50 parts by weight of cyclohexane, and subjected to dispersion treatment in a sand grinder pot to prepare 22 samples of magnetic coating materials different from each other only in the kind of the phosphate contained therein.

Of these magnetic coating materials, the first 11 samples comprise phosphates all having 9 as the number of n, which is a structural factor for the above-mentioned alkylphenylpolyethylene glycol monophosphate, but ranging from 4 to 24 in the number of carbon atoms of the alkyl group in the structural factor $R^4$ as shown in Table 1 by Sample Nos. 1 to 11. The remaining 11 samples comprise phosphates having 9 in the number of carbon atoms of the alkyl group (i.e., a nonylphenyl group) but ranging from 0 to 18 in the number of n, as shown in Table 1 by Sample Nos. 12 to 22.

Next, these 22 kinds of magnetic coating materials thus prepared were respectively coated on polyester films, and then subjected to drying and smoothening processing to produce corresponding 22 kinds of magnetic recording media to have coated films of 3 μm thick each.

Hysteresis squareness ratios were measured with respect to these magnetic recording media. Results are shown in Table 1.

Figure 2:
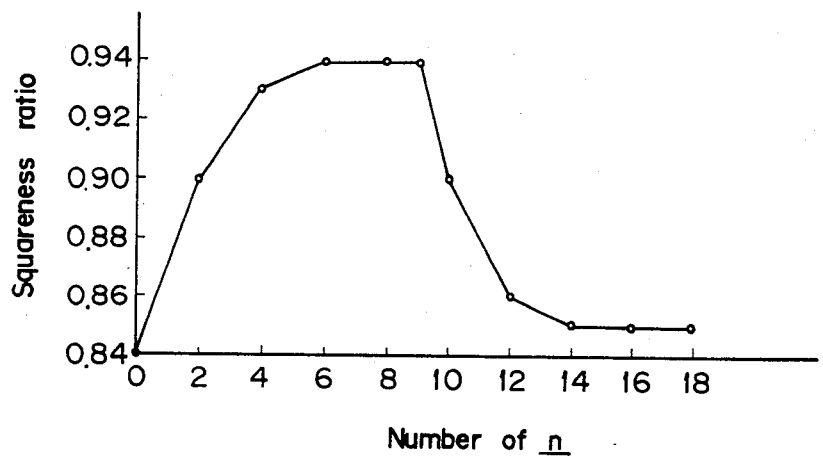
FIG. 2, by showing the relationship between the repetition number n for ethylene oxide which is a structural factor of the phosphate, and the squareness ratio of a magnetic recording medium.

Results of measurement of the squareness ratios are also shown in FIG. 1 as a function of the number of carbon atoms of the alkyl group in the phosphate, and in FIG. 2 as a function of the number of n.

As is apparent from Table 1, FIG. 1 and FIG. 2, large squareness ratios are exhibited when the number of carbon atoms of the alkyl group in the alkylphenyl-polyethylene glycol monophosphate contained in the dispersing agent is in the range of from 8 to 20 and when the repetition number of the units of ethleneoxide is in the range of from 2 to 10.

Further, measurement of wear resistance of these magnetic recording media was carried out. The measurement was carried out by making magnetic tapes of endless type, subjecting them to driving on tape recorders for 100 hours at a driving speed of about 5 m/sec, and thereafter determining decrease in weight of each magnetic recording medium. Wear quantity was not more than 21 mg in every samples of Examples Nos. 1 to 13, showing excellent wear resistance.

TABLE 1

|  | Alkylphenylpolyethylene glycol phosphate | | |
| --- | --- | --- | --- |
| Sample No. | Carbon atom number of alkyl group | Number of n | Hysteresis squareness ratio |
| Comparative Example 1 | 1 | 4 | 9 | 0.85 |
| Comparative Example 2 | 2 | 6 | 9 | 0.86 |
| Example 1 | 3 | 8 | 9 | 0.93 |
| Example 2 | 4 | 10 | 9 | 0.94 |
| Example 3 | 5 | 12 | 9 | 0.938 |
| Example 4 | 6 | 14 | 9 | 0.937 |
| Example 5 | 7 | 16 | 9 | 0.935 |
| Example 6 | 8 | 18 | 9 | 0.933 |
| Example 7 | 9 | 20 | 9 | 0.93 |
| Compartive Example 3 | 10 | 22 | 9 | 0.87 |
| Comparative Example 4 | 11 | 24 | 9 | 0.84 |
| Comparative Example 5 | 12 | 9 | 0 | 0.84 |
| Example 8 | 13 | 9 | 2 | 0.90 |
| Example 9 | 14 | 9 | 4 | 0.93 |
| Example 10 | 15 | 9 | 6 | 0.94 |
| Example 11 | 16 | 9 | 8 | 0.94 |
| Example 12 | 17 | 9 | 9 | 0.94 |
| Example 13 | 18 | 9 | 10 | 0.90 |
| Comparative Example 6 | 19 | 9 | 12 | 0.86 |
| Comparative Example 7 | 20 | 9 | 14 | 0.85 |
| Comparative Example 8 | 21 | 9 | 16 | 0.85 |
| Comparative Example 9 | 22 | 9 | 18 | 0.85 |

EXAMPLES 14 to 20

Relationship between amount of dispersing agent added and squarenessratio or wear resistance Example 1 was repeated, except that kinds of the phosphate and amounts of the dispersing agent comprising the phosphate and the lecithin were varied, to prepare magnetic coating materials. Coating, drying and smoothening processing were carried out to obtain magnetic recording media according to this invention.

As the phosphates, employed were those principally composed of nonylphenylpolyethylene glycol monophosphate (n=9), while maintaining the weight ratios of phosphate/lecithin to 2.5/1.5 each but varying amounts of the dispersing agents in such a manner that a total of the phosphate and the lecithin may range from 2 to 8 parts by weight as shown in Table 2, based on 100 parts by weight of the magnetic particles, to obtain 8 kinds of magnetic recording media corresponding respectively to Samples Nos. 23 to 28.

For these magnetic recording media, the squareness ratio and the wear quantity were measured in the same manner as in Example 1. Results are shown in Table 2, FIG. 3 and FIG. 4.

TABLE 2

|  | Sample No. | Amount of dispersing agent based on 100 wt. parts of magnetic particles (parts by weight) | Squareness ratio | Wear quantity (mg) |
| --- | --- | --- | --- | --- |
| Example 14 | 23 | 2 | 0.86 | 6 |
| Example 15 | 24 | 3 | 0.92 | 6 |
| Example 16 | 17 | 4 | 0.94 | 6 |
| Example 17 | 25 | 5 | 0.94 | 12 |
| Example 18 | 26 | 6 | 0.94 | 21 |
| Comparative Example 19 | 27 | 7 | 0.94 | 39 |
| Comparative Example 20 | 28 | 8 | 0.94 | 68 |

Figure 3:
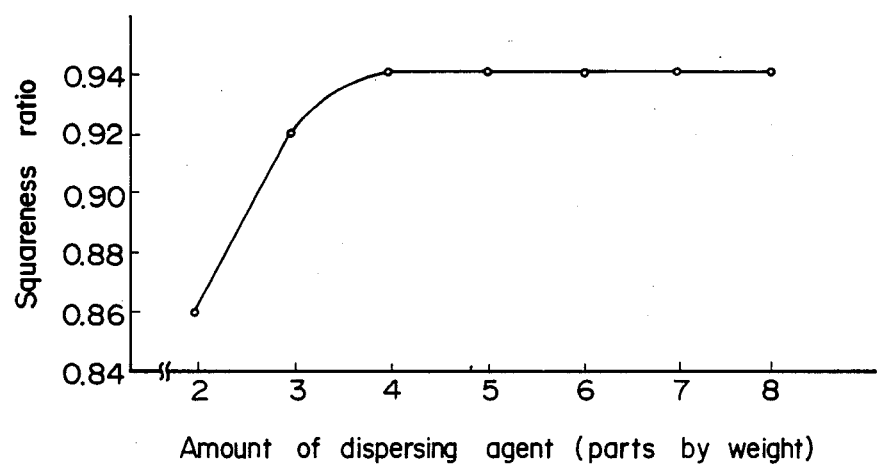
FIG. 3 is an explanatory diagram to show the relationship between the amount of dispersing agent for a magnetic recording medium according to this invention and the squareness ratio thereof.
Figure 4:
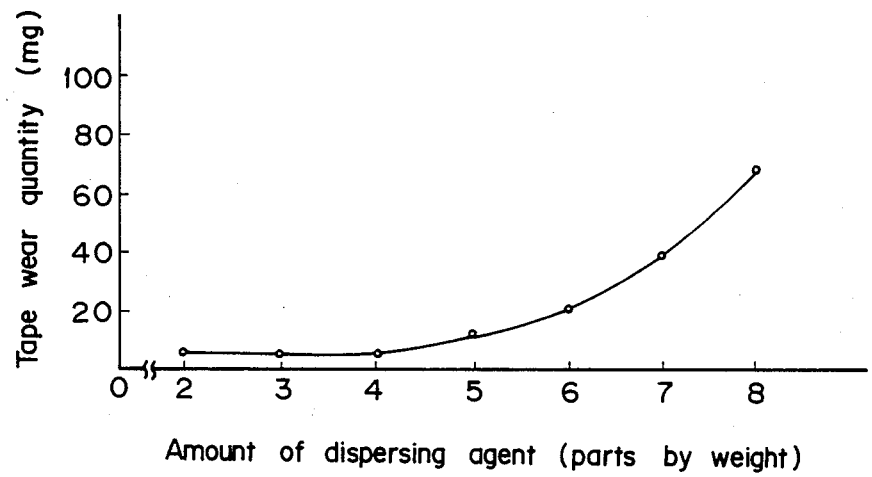
FIG. 4, the relationship between the amount of dispersing agent for a magnetic recording medium according to this invention and the wear resistance thereof.

FIG. 3 shows the relationship between the amount of dispersing agent added and the squareness ratio, and FIG. 4 the relationship between the amount of dispersing agent added and the wear quantity.

As is apparent from Table 2, FIG. 3 and FIG. 4, it is preferred that the dispersing agent is contained in an amount of from 2 to 6 parts by weight. When it is in an amount exceeding 6 parts by weight, the wear resistance tends to be lowered.

EXAMPLES 21 to 26

Relationship between weight ratio of phosphate and lecithin in the dispersing agent and squareness ratio Example 1 was repeated, except that kinds of the phosphate and amounts of the lecithin added were varied, to obtain magnetic coating materials. Coating, drying and smoothening processing were carried out to obtain magnetic recording media according to this invention.

As the phosphates, employed were those principally composed of nonylphenyl polyethylene glycol monophosphate (n=9), while maintaining amounts of the same to 2.5 parts by weight based on 100 parts by weight of the magnetic particles but varying amount of the lecithin in such a manner that a weight ratio of the phosphate to the lecithin may range from 5:1 to 1:1, to obtain 7 kinds of magnetic recording media (Sample Nos. 29 to 35).

For these magnetic recording media, the squareness ratio and the wear quantity were measured in the same manner as in Example 1. Results are shown in Table 3, FIG. 5 and FIG. 6.

TABLE 3

|  | Sample No. | Weight ratio of phosphate/lecithin | Squareness ratio | Wear quantity (mg) |
| --- | --- | --- | --- | --- |
| Example 21 | 29 | 1 | 0.90 | 5 |
| Example 22 | 30 | 1.67 | 0.94 | 6 |
| Example 23 | 31 | 2 | 0.94 | 6 |
| Example 24 | 32 | 3 | 0.93 | 8 |
| Example 25 | 33 | 4 | 0.92 | 10 |

TABLE 3-continued

| Sample No. | Weight ratio of phosphate/lecithin | Squareness ratio | Wear quantity (mg) |
|---|---|---|---|
| Example 26 | 34 | 5 | 0.91 | 16 |

Figure 5:
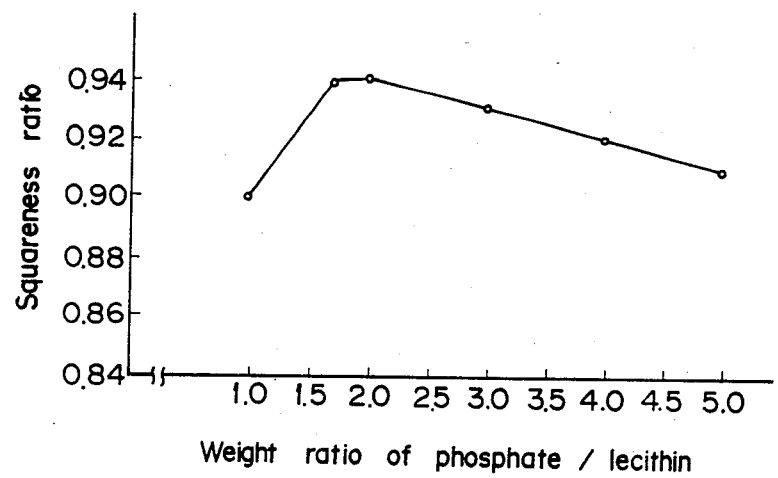
FIG. 5 is an explanatory diagram to show the relationship between the weight ratio of phosphate/lecithin used for the magnetic recording medium according to this invention and the squareness ratio thereof.
Figure 6:
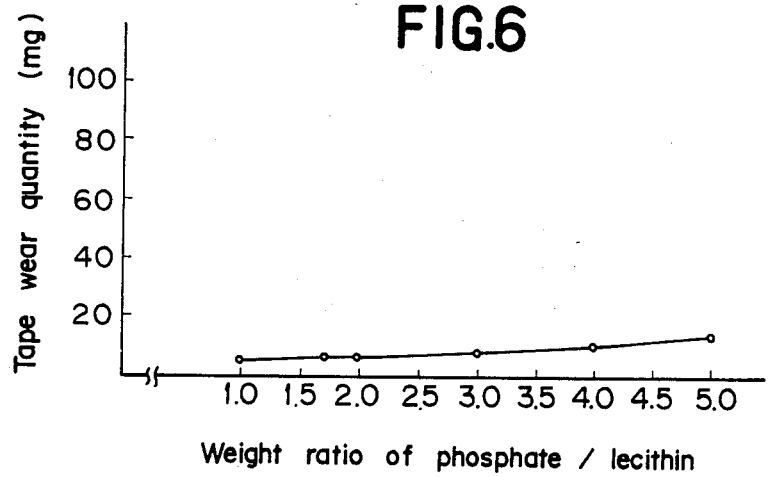
FIG. 6, the relationship between the weight ratio of phosphate/lecithin used for the magnetic recording medium according to this invention and the wear resistance thereof.

FIG. 5 shows the relationship between the weight ratio of phosphate/lecithin and the squareness ratio, and FIG. 6 the relationship between the weight ratio of phosphate/lecithin and the wear quantity.

As is apparent from Table 3, FIG. 5 and FIG. 6, it is preferred that the weight ratio of the phosphate to the lecithin ranges from 5:1 to 1:1.

Comparative Example 10

Magnetic coating materials were prepared, in the same manner as in Example 12, Example 16 or Example 23, except that no lecithin was added. Coating, drying and smoothening processing were then carried out to obtain magnetic recording media. In respect of these magnetic recording media, the squareness ratio and the wear quantity were measured in the same manner as in the above Example 12. As a result, the squareness ratio was found to be 0.92 and the wear quantity to be 65 mg.

EXAMPLE 28

Magnetic coating materials were prepared in the same manner as in Example 1, except that employed as phosphates were those principally composed of tridecylpolyethylene glycol monophosphates (n=5). Coating drying and smoothening processing were then carried out to obtain magnetic recording media according to this invention. In respect of these magnetic recording media, the squareness ratio and the wear quantity were measured in the same manner as in Example 1. As a result, the squareness ratio was found to be 0.92 and the wear quantity to be 6 mg.

Similarly, high squareness ratio and wear resistance can be also attained when employed as the phosphate was a diester or triester of phosphoric acid with tridecylpolyethylene glycol.

EXAMPLES 29 TO 31 AND COMPARATIVE EXAMPLES 11 TO 13

Three kinds of magnetic coating materials each containing different kinds of magnetic particles were prepared in the same manner as in Example 12, except that employed as the magnetic particles were metallic magnetic particles for use in magnetic tapes and principally composed of $\gamma$-Fe$_2$O$_3$, Co-deposited $\gamma$-Fe$_2$O$_3$ and Fe having particle size of 0.6, 0.4 and 0.2 $\mu$m and corecive force of 320, 650 and 1500 Oe, respectively, in place of the Ba(CoTi)$_{0.5}$Fe$_{11}$O$_{19}$ particles. Coating, drying and smoothening processing were carried out to obtain corresponding three kinds of magnetic recording media according to this invention.

On the other hand, for comparison of performance with these three kinds of magnetic recording media, also obtained were three kinds of magnetic recording media each using different kinds of magnetic particles in the same manner as in the above, except that no lecithin was contained in the dispersing agent.

For these magnetic recording media, the squareness ratio and the wear quantity were measured in the same manner as in Example 12. Results are shown in Table 4.

TABLE 4

|  | Magnetic particles | Addition of lecithin | Squareness ratio | Ware quantity (mg) |
|---|---|---|---|---|
| Example 29 | $\mu$—Fe$_2$O$_3$ | Yes | 93 | 3 |
| Example 30 | Co-deposited $\mu$—Fe$_2$O$_3$ | " | 88 | 3 |
| Example 31 | Fe—Ni alloy powder | " | 92 | 8 |
| Comparative Example 11 | $\mu$-Fe$_2$O$_3$ | No | 89 | 38 |
| Comparative Example 12 | Co-deposited $\mu$-Fe$_2$O$_3$ | " | 85 | 45 |
| Comparative Example 13 | Fe—Ni alloy powder | " | 83 | 70 |

As is seen from Table 4, both the squareness ratio and the wear resistance are lowered and, in particular, the wear resistance is extremely lowered when the dispersing agent contains phosphate only and no lecithin is present therein.

We claim:

1. A magnetic recording medium which comprises (i) magnetic particles; (ii) a phosphate represented by the formula:

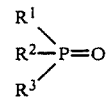

wherein $R^1$, $R^2$ and $R^3$ may be the same or different and each is represented by the formula $R^4O$—$CH_2O$—$_n$, wherein $R^4$ is an alkyl group having 8 to 20 carbon atoms or an alkylphenyl group whose alkyl group moiety has 8 to 20 carbon atoms, and n is an integer of 2 to 10, or by the formula HO—, with the proviso that at least one of $R^1$, $R^2$ and $R^3$ is represented by said formula $R^4O$—$CH_2CH_2O$—$_n$; (iii) a lecithin; and (iv) a binder, wherein the weight mixing ratio of said phosphate and said lecithin ranges from about 5:1 to about 1:1.

2. The magnetic recording medium according to claim 1, wherein said magnetic particles are particles of at least one magnetic material selected from the group consisting of $\gamma$-Fe$_2$O, Co-deposited $\gamma$-Fe$_2$O$_3$, Fe, Fe-Ni alloy, Fe-Ni-Co alloy, and a hexagonal ferrite represented by the formula: MO.$_n$(Fe$_{1-x}$A$_x$)$_2$O$_3$, wherein M represents any one of Ba, Sr, Pb and Ca; n represents a number of 5 to 6; A represents a transition metal selected from the group consisting of Ti, Co, Zn, In, Mn, Cu, Ge and Nb; and $0 \leq x \leq 0.2$.

3. The magnetic recording medium according to claim 2, wherein said magnetic material is hexagonal ferrite having a mean particle size ranging from 0.01 to 0.3 $\mu$m and coercive force ranging from 200 to 2000 Oe.

4. The magnetic recording medium according to claim 1, wherein the total amount of the phosphate and the lecithin ranges from 2 to 6 parts by weight based on 100 parts by weight of the magnetic particles.

5. The magnetic recording medium according to claim 1, wherein said binder is contained in an amount of from 15 to 25 parts by weight based on 100 parts by weight of the magnetic particles.

* * * * *